US012638043B2

(12) United States Patent    (10) Patent No.:   US 12,638,043 B2

Vollmer et al.    (45) Date of Patent:   May 26, 2026

---

(54) BALL SOCKET APPARATUS AND BALL JOINT APPARATUS HAVING SUCH A BALL SOCKET APPARATUS

(71) Applicant: ILLINOIS TOOL WORKS INC., Glenview, IL (US)

(72) Inventors: Gerit Vollmer, Enkenbach-Alsenborn (DE); Albert Sbongk, Enkenbach-Alsenborn (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 533 days.

(21) Appl. No.: 18/065,960

(22) Filed: Dec. 14, 2022

(65) Prior Publication Data

US 2023/0193948 A1   Jun. 22, 2023

(30) Foreign Application Priority Data

Dec. 16, 2021   (DE) ..................... 10 2021 133 498.5
Apr. 20, 2022   (DE) ..................... 10 2022 109 504.5
Nov. 4, 2022   (DE) ..................... 10 2022 129 175.8

(51) Int. Cl.
*F16C 11/06*    (2006.01)

(52) U.S. Cl.
CPC ...... *F16C 11/0638* (2013.01); *F16C 11/0614* (2013.01); *F16C 11/0657* (2013.01); *Y10T 403/32803* (2015.01)

(58) Field of Classification Search
CPC .............. F16C 11/0623; F16C 11/0628; F16C 11/0633; F16C 11/0638; F16C 11/0654;

F16C 11/0657; F16C 11/086; Y10T 403/32713; Y10T 403/32737; Y10T 403/32786; Y10T 403/32795; Y10T 403/32803

See application file for complete search history.

(56) References Cited

U.S. PATENT DOCUMENTS

| | | | | |
|---|---|---|---|---|
| 2,361,025 A | * | 10/1944 | Graham .............. | F16C 11/0652 403/133 |
| 2,417,160 A | * | 3/1947 | Graham .............. | F16C 11/0652 403/132 |
| 2,424,431 A | * | 7/1947 | Booth ................. | F16C 11/0652 285/271 |
| 2,855,232 A | * | 10/1958 | Kozak ................... | F16C 11/083 403/143 |
| 2,973,980 A | * | 3/1961 | Vogt ........................ | F16C 11/06 403/133 |
| 3,259,408 A | * | 7/1966 | Herbenar ............ | F16C 11/0619 403/138 |

(Continued)

FOREIGN PATENT DOCUMENTS

| | | |
|---|---|---|
| DE | 10361289 B4 | 5/2006 |
| DE | 102010005134 A1 | 7/2011 |

(Continued)

*Primary Examiner* — Amber R Anderson
*Assistant Examiner* — Kevin J Baynes
(74) *Attorney, Agent, or Firm* — THOMPSON HINE LLP

(57) ABSTRACT

A ball socket apparatus is provided for bearing a joint head. The apparatus includes a first ball shell element and a second ball shell element, wherein the ball socket apparatus forms a preferably radially circumferential, continuous contact surface for a joint head, and a first and a second housing device in which the ball shell elements are arranged.

10 Claims, 4 Drawing Sheets

(56)                    References Cited

U.S. PATENT DOCUMENTS

| | | | | | | |
|---|---|---|---|---|---|---|
| 3,273,924 | A | * | 9/1966 | Gottfried | ................ | F16C 11/06 |
| | | | | | | 403/140 |
| 3,578,366 | A | * | 5/1971 | Snidar | ................. | F16C 11/0671 |
| | | | | | | 403/140 |
| 3,647,249 | A | * | 3/1972 | Baba et al. | ......... | F16C 11/0652 |
| | | | | | | 403/126 |
| 3,944,376 | A | * | 3/1976 | Hata | ................... | F16C 11/0685 |
| | | | | | | 403/138 |
| 4,003,667 | A | * | 1/1977 | Gaines | ................ | F16C 11/0638 |
| | | | | | | 277/635 |
| 4,089,095 | A | * | 5/1978 | Becker | ................ | F16C 11/0676 |
| | | | | | | 29/898.044 |
| 4,372,621 | A | * | 2/1983 | Farrant | ................. | F16C 11/086 |
| | | | | | | 384/2 |
| 4,564,307 | A | * | 1/1986 | Ito | ........................ | F16C 11/0638 |
| | | | | | | 403/140 |
| 4,577,989 | A | * | 3/1986 | Ito | ........................ | F16C 11/0638 |
| | | | | | | 403/135 |
| 4,591,276 | A | * | 5/1986 | Schneider | ........... | F16C 11/0638 |
| | | | | | | 384/206 |
| 6,092,954 | A | * | 7/2000 | Mizutani | ............. | F16C 11/0638 |
| | | | | | | 403/140 |
| 6,164,861 | A | * | 12/2000 | Maughan | ............ | F16C 11/0638 |
| | | | | | | 403/135 |
| 6,171,012 | B1 | * | 1/2001 | Westphal | ............ | F16C 11/0638 |
| | | | | | | 403/135 |
| 6,554,525 | B1 | * | 4/2003 | Heidemann | ......... | F16C 11/0638 |
| | | | | | | 403/140 |
| 6,692,179 | B2 | * | 2/2004 | Bohne | ................. | F16C 11/0614 |
| | | | | | | 403/140 |
| 6,821,047 | B2 | * | 11/2004 | Broker | ................ | F16C 11/0685 |
| | | | | | | 403/138 |
| 9,518,602 | B2 | * | 12/2016 | Forthaus | ............. | F16C 11/0647 |
| 9,546,679 | B2 | * | 1/2017 | Sato | .................... | F16C 11/0638 |
| 11,339,824 | B2 | * | 5/2022 | Schaumann | .......... | B60G 7/005 |
| 11,542,981 | B2 | * | 1/2023 | Doherty | ................ | B60G 7/005 |
| 2005/0051974 | A1 | * | 3/2005 | Dobson | .............. | F16C 11/0666 |
| | | | | | | 277/635 |
| 2011/0033227 | A1 | * | 2/2011 | Kwon | ............... | B29C 45/14491 |
| | | | | | | 403/135 |
| 2012/0141192 | A1 | * | 6/2012 | Kwon | ................. | F16C 11/0604 |
| | | | | | | 164/90 |

FOREIGN PATENT DOCUMENTS

| | | | | | | |
|---|---|---|---|---|---|---|
| DE | 102020209477 | B3 | | 12/2021 | | |
| EP | 2639464 | B1 | | 9/2013 | | |
| GB | 600265 | A | * | 4/1948 | .......... | F16C 11/0652 |
| GB | 2038928 | A | * | 7/1980 | .......... | F16C 11/0638 |
| GB | 2052620 | A | * | 1/1981 | .......... | F16C 11/0638 |
| GB | 2106173 | A | * | 4/1983 | .......... | F16C 11/0614 |
| WO | WO-0140669 | A1 | * | 6/2001 | .......... | F16C 11/0638 |
| WO | WO-2005066510 | A1 | * | 7/2005 | .......... | F16C 11/0628 |
| WO | WO-2008040279 | A1 | | 4/2008 | | |
| WO | WO-2014111215 | A1 | | 7/2014 | | |

* cited by examiner

35

39

35

38

33

1

30

32

36

38

37

39

33

BALL SOCKET APPARATUS AND BALL JOINT APPARATUS HAVING SUCH A BALL SOCKET APPARATUS

TECHNICAL FIELD

The present invention relates to a ball socket apparatus as well as a ball joint apparatus having such a ball socket apparatus.

BACKGROUND OF THE INVENTION

A ball socket or ball bushing is part of a ball joint bearing or ball joint apparatus in mechanical engineering. The ball socket receives a joint head or a ball head or a ball pin. These typically have a ball portion and an arm portion. A ball of the ball head is enclosed by the socket to the extent that only rotary movements are possible.

Ball sockets are used in vehicle steering and trailer couplings, among other things.

For example, by using more expensive components associated with the electrification of steering systems, the steering systems are becoming more expensive. At the same time, OEMs are not willing to pay higher prices. Consequently, the suppliers of steering systems struggle with high cost pressures.

WO 2008/040279 A1 discloses a ball joint for a vehicle. It includes a housing, a ball pin seated in the housing and extending out of said housing, which pin comprises a connecting region and a joint ball, which is movably borne in the housing with the interposition of a ball shell, and comprises a wall surrounding the joint ball, in which a plurality of longitudinal slots extending arcuately in the axial direction are provided, wherein the wall comprises a plurality of transverse slits extending arcuately transversely to the longitudinal slots.

WO 2014/111215 A1 describes a ball joint. This is, in particular, an axial joint with a ball pin received in a ball shell, both of which are received in a joint housing, wherein the ball shell is formed integrally with at least one spring element in a region of the ball shell facing away from the joint housing opening, wherein the spring element comprises interruptions, in particular by slots, so that wear compensation is provided within the ball joint by the spring element.

EP 2 639 464 B1 discloses a ball joint. It comprises a joint housing having a recess, a ball pin having a ball head, and a sealing bellows having a housing-side sealing seat and a pin-side sealing seat in the form of a bellows mouth that can be brought into contact with the ball pin, wherein a bellows body of the sealing bellows extends between the housing-side sealing seat and the bellows mouth. The ball joint further comprises a joint shell, wherein the ball head is pivotally received within the joint shell and the joint shell is inserted into the recess of the joint housing. Such a ball joint is of modular design, wherein it can be fully assembled in a few steps.

In DE 10 2010 005 134 A1, a ball joint is described, which comprises a joint housing, a bearing shell accommodated in the joint housing, and a ball pin with a ball head that is pivotally arranged in the bearing shell. The ball head is biased against the joint housing substantially in the direction of a longitudinal axis of the ball pin by a spring system. The spring system is formed from spring elements connected in parallel and/or in series, wherein at least one spring element of the spring system is made from a polymeric material or an elastomeric material.

SUMMARY OF THE INVENTION

The problem addressed by the present invention is to provide a ball socket apparatus for bearing a joint head, as well as a ball joint apparatus having such a ball socket apparatus, which is easy to assemble.

A further problem addressed by the present invention is to form a ball socket apparatus for bearing a joint head as well as a ball joint apparatus having such a ball socket apparatus that is safe and reliable in operation.

A further problem addressed by the present invention is to provide a ball socket apparatus as well as a ball joint apparatus having such a ball socket apparatus that offers an alternative to apparatuses known in the prior art and is simply constructed.

According to the present invention, a ball socket apparatus is provided for bearing a joint head. This comprises a first ball shell element and a second ball shell element, wherein the ball socket apparatus forms a preferably radially circumferential, continuous contact surface for a joint head, and a first and a second housing device in which the ball shell elements are arranged.

The ball socket apparatus thus relates to a ball socket or ball bushing for bearing a joint head or ball head or ball pin. Such a joint head typically has a ball portion or a ball-shaped portion received and borne in the ball socket apparatus and an arm portion connecting the ball head bearing to, for example, a steering system or similar mechanical components.

An axial direction in the context of the present invention is understood to mean a direction that is parallel to an arm portion of a joint head.

The first and second ball shell segments are preferably configured so as to be symmetrical. Due to the fact that the ball socket apparatus can consist of the first ball shell element and the second ball shell element, the apparatus according to the invention is simply constructed from four parts and can be easily manufactured.

Accordingly, the ball socket apparatus according to the invention can comprise the first and the second ball shell elements, wherein the ball shell elements each form a radially circumferential, continuous contact surface for a joint head. The two ball shell elements can also merely form a single radially circumferential, continuous contact surface for a joint head.

Although the ball shell element can comprise a slot extending in the axial direction, it is still referred to as a continuous, radially circumferential contact surface for a ball portion of a ball joint in the context of the present invention.

The first and the second ball shell elements are approximately half-shell shaped, wherein the two ball shell elements form at least one continuous contact surface that extends radially circumferentially about a joint head. Thus, only these two elements contact a corresponding ball portion of a joint head with their contact surface(s).

The ball socket apparatus can be configured so as to be directly insertable into a housing device of a ball joint apparatus. The first and the second housing devices are provided for this purpose. The first and second housing devices are preferably also symmetrically formed and comprise two free, radially circumferential edges that extend approximately orthogonally to the axial direction.

At least one of the ball shell elements and preferably both ball shell elements can be configured as ball segment portions. These ball segment portions comprise at least one free edge, hereinafter referred to as the connecting edge. This connecting edge extends orthogonally to the axial direction.

In the following, a plurality of individual technical aspects according to the invention are described for the ball socket apparatus according to the invention. These individual aspects according to the invention each represent a single idea of the invention. However, the individual aspects can be partially or entirely a part of a ball socket apparatus according to the invention. This means that the individual aspects according to the invention can be combined in part or in full with one another as desired, wherein each aspect can also represent a unique inventive idea.

According to a first aspect of the ball socket apparatus according to the invention, an outer casing wall of the housing device can comprise a housing tolerance compensation structure.

The housing tolerance compensation structure is provided for compensating a clearance between the housing device of the ball socket apparatus and a joint housing of a ball joint apparatus. With the housing tolerance compensation structure, the outer casing wall of the housing device is structured or comprises a structuring, wherein the housing tolerance compensation structure is configured, for example, as a knurling or as ribs, which preferably extend in an axial direction or can be inclined towards the axial direction. Additionally and/or alternatively, radially circumferential ribs can also be provided on the outer casing wall of the housing device. Accordingly, the structure can also be a grid or mesh shape.

The housing tolerance compensation structure can compensate for material of the housing device that flows away during use, such that the housing device or the housing can be arranged in a joint housing of a ball joint apparatus in a clearance-free manner.

The tolerance compensation structure can be formed or manufactured by a corresponding deformation structure upon injection molding of the ball socket apparatus.

According to a second aspect of the ball socket apparatus according to the invention, which can be realized individually or in combination with the first aspect of the ball socket apparatus according to the invention, an inner casing wall of the housing device can have a first tolerance compensation structure and/or an outer casing wall of the ball shell element can have a second tolerance compensation structure.

The first and/or the second tolerance compensation structure are configured so as to compensate for a clearance between the housing device and the ball shell elements. Accordingly, the outer casing wall of the housing device and/or the ball shell element can be structured so as to provide the first and/or the second tolerance compensation structure, wherein the first and the second tolerance compensation structure can be formed as a knurling and/or as ribs, which are preferably arranged in a grid-like manner with respect to one another.

It is preferably provided here that the first tolerance compensation structure of the inner casing wall of the housing device is formed by ribs extending in the axial direction or orthogonally or radially circumferentially hereto. Accordingly, the second tolerance compensation structure of the outer casing wall of the ball shell element can be arranged with a 90° offset thereto or radially circumferentially or orthogonally to the axial direction, so that the first and the second tolerance compensation structure are arranged in an approximately grid shape to one another and have a plurality of contact points in the region of the grid points.

With the first and the second tolerance compensation structure, a clearance between the ball shell element and the corresponding housing device is also avoided, which can occur upon use or strain of the ball shell elements in operation due to the flowing away of the material of the ball shell element and/or the housing device.

According to a third aspect of the ball socket apparatus according to the present invention, which can be realized individually or in combination with the previous aspects of the ball socket apparatus according to the invention, the first and the second housing devices can have a radially circumferential connecting edge, wherein connecting webs and connecting recesses for receiving the connecting webs extending in the axial direction are arranged in the connecting edge, such that the first and the second housing devices respectively comprise connecting recesses and connecting webs configured and arranged correspondingly to one another, or are identically formed.

The connecting recesses and the connecting webs can be connected to one another by means of a press fit, preferably radially circumferential and acting in the axial direction, in order to form the housing.

The two housing devices can be identical in that the first and second housing devices comprise connecting webs extending in the axial direction and correspondingly configured connecting recesses for receiving the connecting webs. This significantly facilitates assembly and reduces production costs by requiring a smaller number of different components.

In addition, the two housing devices can be easily connected to one another in this way.

According to a further aspect of the ball socket apparatus according to the invention, which can be realized individually or in combination with the previous aspects of the ball socket apparatus according to the invention, the ball shell element can comprise catching elements extending in the axial direction and/or in the radial direction, which are in particular receivable or clippable in an undercut manner in correspondingly configured catching recesses of the housing device.

In this way, the ball shell element can be connected to the housing device in a loss-proof manner.

By providing corresponding catching elements and catching recesses, a first ball shell element and a first housing device or a second ball shell element and a second housing device can be pre-assembled and transported without separating the ball shell elements and the housing devices from one another. This facilitates a later assembly.

To the extent to which the catching elements and the corresponding catching recesses extend orthogonally to the axial direction in both the axial direction and in a radial direction, a corresponding connection between the ball shell element and the housing device is particularly securely configured.

According to a further aspect of the ball socket apparatus according to the invention, which can be realized individually or in combination with the previous aspects of the ball socket apparatus according to the invention, an inner casing wall of the ball shell element can be formed as a circular segment in cross-section, wherein, in the region of a connecting edge of the ball shell element, the inner casing wall comprises a tangential outlet portion for connecting with a further ball shell element, which outlet portion deviates from a particularly ideal circular shape.

With the tangential outlet portion, stress peaks in the material of the ball shell element can be reduced or prevented.

The inventors of the present invention have found that stress peaks can occur in the material of the ball shell elements in the region of the connecting edge, which arise in the material in the injection molding during the manufacture and can occur in operation by a ball portion of a joint head and enable the material to flow away. These stress peaks are safely and reliably reduced or prevented by the tangential outlet portion.

In this region, a corresponding ball portion of a ball joint head does not abut, but rather is arranged so as to be spaced apart from this tangential outlet portion.

According to a further aspect of the ball socket apparatus according to the invention, which can be realized individually or in combination with the previous aspects of the ball socket apparatus according to the invention, the housing device can comprise a circular base wall portion against which an axial end portion of the ball shell element abuts.

In this way, a flow-away of the material of the ball shell element in this region can be prevented.

Forces occurring in operation or forces acting on the ball shell elements can enable a slight flow-away of the material from which the ball shell element is formed. Due to the fact that the housing device comprises an annular base wall portion that extends in the radial direction or orthogonally to the axial direction and against which an axial end portion of the ball shell segment abuts, this region of the ball shell element cannot flow away under stress, but rather a flow of the material is prevented in the axial direction by the annular base wall portion or regions thereof. In this manner, a flow brake is formed.

According to a further aspect of the ball socket apparatus according to the invention, which can be realized individually or in combination with the previous aspects of the ball socket apparatus according to the invention, the housing device can comprise an annular base wall portion having an open annular ring receiving recess in which an annular elastomeric or EPDM ring is arranged.

As a result, axial forces occurring in the ball socket apparatus can be absorbed.

The base wall portion and thus the elastomeric ring can be configured, in particular, in the region of an arm portion of a joint head, wherein preferably a surface of the base wall portion of the ring receiving recess facing in the radial direction is formed in an undercut manner in order to receive the elastomeric ring in a loss-proof manner and/or partially receive loads acting on the elastomeric ring.

With a housing device having the annular ring receiving recess for receiving an elastomeric or EPDM ring, forces acting in the axial direction that can occur during operation can be absorbed in this region.

In this way, an increased stability of the ball socket apparatus according to the invention and a safe operation is ensured.

According to this aspect, a ball socket apparatus is provided for the first time in which an EPDM ring is provided in the region of an arm portion of a ball joint head in the ball socket apparatus.

Due to the undercut configuration, preferably a surface of the base wall portion facing in the radial direction, it is possible to arrange the EPDM ring in a loss-proof manner in the housing device.

In addition, such an undercut configuration, [preferably] a surface facing in the radial direction, can partially absorb stress acting on the elastomeric ring.

According to a further aspect of the ball socket apparatus according to the invention, which can be realized individually or in combination with the previous aspects of the ball socket apparatus according to the invention, the ball shell elements and the corresponding housing devices can be manufactured by means of a dual component injection molding method from two different plastics, such that a ball shell element and a corresponding housing device are connected to one another in a material-locking manner.

However, it is preferably provided that a ball shell element as shown above in one aspect is clipped into the housing device and arranged therein in a rotation-proof and loss-proof manner.

The housing device can be made of a plastic by means of injection molding, wherein the plastic can have a glass fiber content of about 30% by volume.

According to a further aspect of the ball socket apparatus according to the invention, which can be realized individually or in combination with the previous aspects of the ball socket apparatus according to the invention, the ball shell elements can be manufactured or configured from polyketone (PK), polyphthalamides (PPA), polybutylene terephthalate (PBT) with carbon fiber reinforcement or carbon fibers for reinforcement, and/or polytetrafluoroethylene (PTFE) and/or graphite.

In particular, POM can also be provided as a ball shell material, which is configured to be more creep-resistant by chemical additives or the addition of reinforcing fibers in order to improve tribology. Possible additions or additives here can be carbon fibers, PTFE, and graphite (as described above).

In order to maintain the breaking elongation within an acceptable range, the carbon fiber content is rather low and should amount to about at least 1 vol. % or at least 5 vol. % to a maximum of about 10 vol. %.

According to a further aspect of the ball socket apparatus according to the present invention, which can be realized individually or in combination with the previous aspects of the ball socket apparatus according to the invention, a joint housing is provided along with a ball socket apparatus received in the joint housing with one or more or all of the aspects of the ball socket apparatus described above, and a joint head having a ball portion and preferably an arm portion, which is pivotally borne in the ball socket apparatus.

The advantages of the ball joint apparatus according to the invention correspond analogously to the advantages explained above on the basis of the different aspects of the ball socket apparatus according to the invention.

Furthermore, the ball shell elements can each comprise a first and a second housing device in which the ball shell segments are arranged, wherein both housing devices form a housing that is cylindrical or conical.

Such a housing is a further technical feature of the present invention and does not replace the housing devices of the ball socket apparatuses described at the outset. The housing, if present, is insertable into such a housing device of a ball joint apparatus.

The fact that the ball shell elements each comprise a housing device significantly simplifies the assembly of the ball socket apparatus. In particular, a housing device tapered in the assembly direction facilitates the assembly of the ball socket apparatus in a corresponding ball joint bearing.

The ball shell elements can be arranged in the respective housing device in a rotation-proof manner, for example by means of a corresponding catching device and/or a material-locking connection.

In this way, a mechanical frictional lock is achieved between the ball shell elements and the housing or between a corresponding inner part (ball shell elements) and the corresponding outer part (housing). Thus, forces occurring in the ball joint bearing can be dissipated.

A housing is particularly advantageous in that the ball socket apparatus and thus the contact surface to the joint head can be formed from a material with very good tribological properties. The housing, on the other hand, is formed from a material with mechanically better properties, in particular with regard to the creep behavior, and thereby prevents a creeping or flowing away of the inner material.\

A catching device can be provided between the housing devices and the ball shell elements.

A rotation-proofing is thus provided between the ball shell elements and the housing devices.

The ball shell elements and the housing devices can also be manufactured by means of a dual component injection molding method, such that a ball shell element and a corresponding housing device are connected to one another in a material-locking manner.

In this way, a rotation-proofing is also provided between the ball shell elements and the housing.

The ball shell elements can be formed from a polyketone (PK) and/or polyphthalamide (PPA) and can preferably contain carbon fibers and/or additives to improve sliding properties such as, for example, PTFE and/or graphite.

Existing devices are typically referred to as 1K parts of polyoxymethylene (POM) or polyacetals. If increased forces or stresses occur in a ball joint, the diameter of the ball joint typically increases in order to obtain a constant surface compression on a ball socket apparatus.

The inventors of the present invention have found that downsizing such ball joint bearings with such a selection of material is not possible. As an alternative to a POM, sometimes PEAK is also used as a material for a ball socket apparatus. This allows for higher surface compression in combination with higher temperatures; however, the sliding properties are significantly deteriorated as a result.

With the ball socket apparatus according to the invention, due to the selection of the material, a solution is provided for the first time which enables downsizing of ball joints.

In addition, the material of the ball shell elements can be adapted to the specific requirements and stresses of a ball joint bearing. By providing carbon fibers and/or PTFE and/or graphite, lower frictional forces also occur in the ball socket apparatus according to the invention. In order to enable a ball joint bearing to be downsized, the requirements for the raw material in terms of the maximum force to be applied and the creeping behavior increase at the same time. This results in the material properties of an unreinforced POM component no longer being sufficient for such applications.

Thus, the ball socket apparatus according to the invention can additionally be provided to use carbon fibers in order to improve the mechanical properties in terms of the creeping resistance and sliding properties.

Reinforcing POM with carbon fibers does not yet appear possible. Therefore, the ball socket apparatus according to the invention is preferably formed from polyketone or PPA.

Additionally or alternatively, other materials can also be suitable for the ball socket apparatus according to the invention. However, these can have a higher e-modulus than the known materials used for ball socket apparatuses and thus cause a significantly reduced breaking elongation.

The breaking elongation of a material suitable for the ball socket apparatus according to the invention is between 3% and 6%.

A breaking elongation of ball socket apparatuses formed from POM is about 30%. This has a direct effect on the design of the ball socket apparatus, because undercuts are not possible with such a breaking elongation. Simple and secure assembly is thus not possible with known materials.

BRIEF DESCRIPTION OF THE DRAWINGS

The ball socket apparatus according to the invention will now be described in further detail on the basis of an exemplary embodiment shown in the figures. The figures show.

DETAILED DESCRIPTION

Figures 1, 2:
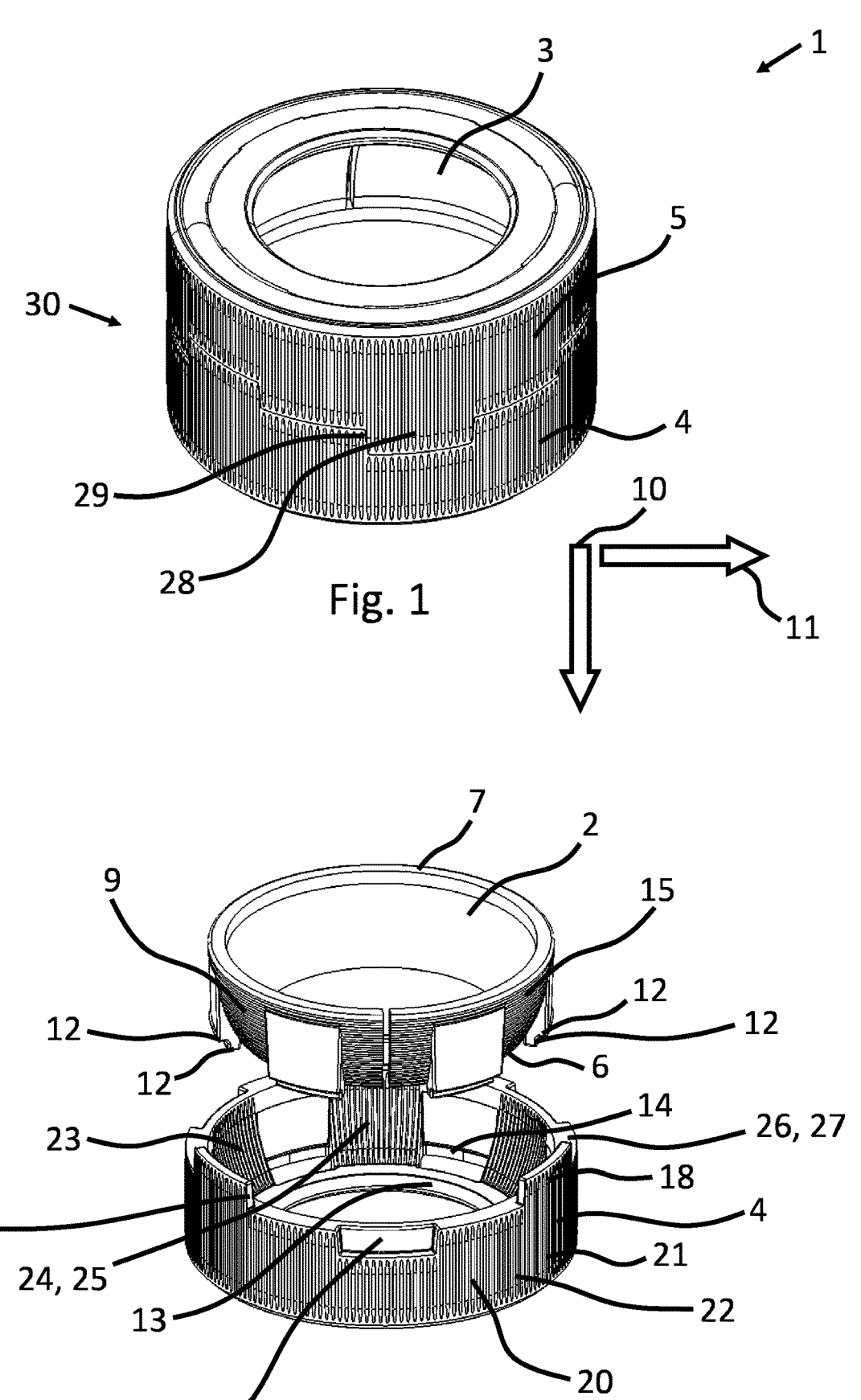
FIG. 1 shows a perspective view of a ball socket apparatus according to the invention.
FIG. 2 shows an exploded perspective view of a first ball shell element and a first housing device of the ball socket apparatus.
Figure 3:
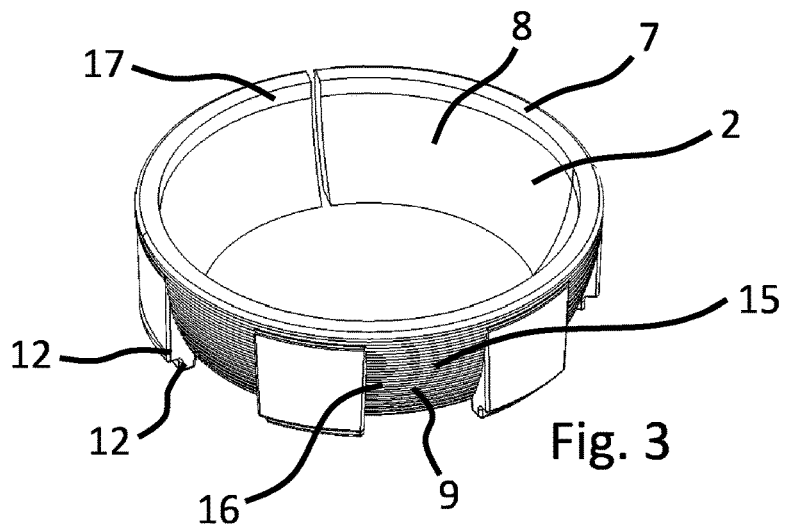
FIG. 3 shows a perspective view of the ball shell element.
Figure 4:
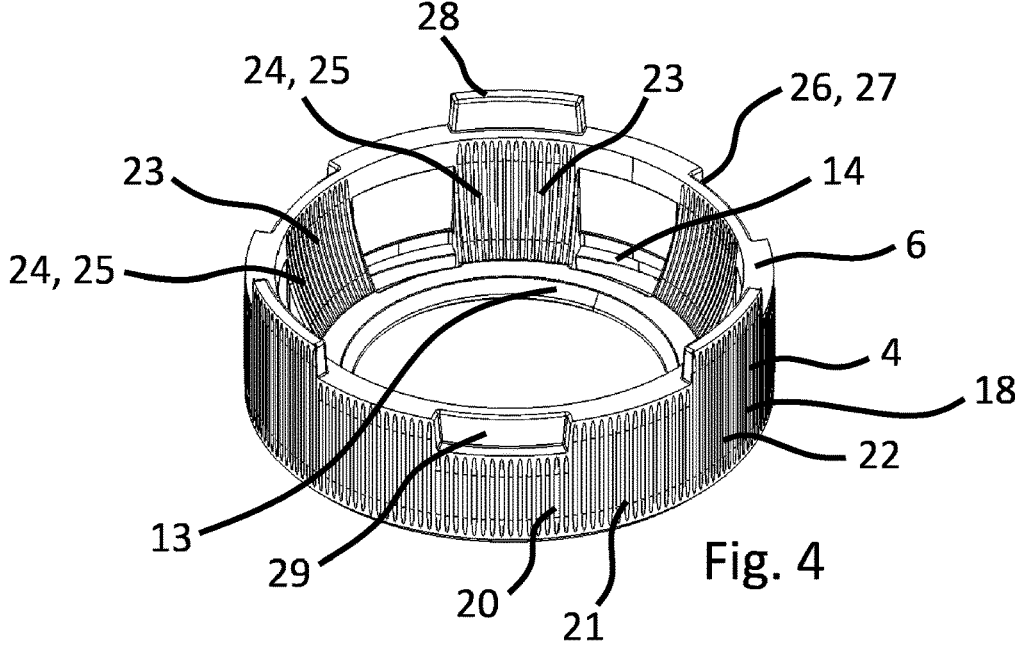
FIG. 4 shows a perspective view of the housing device.
Figure 5:
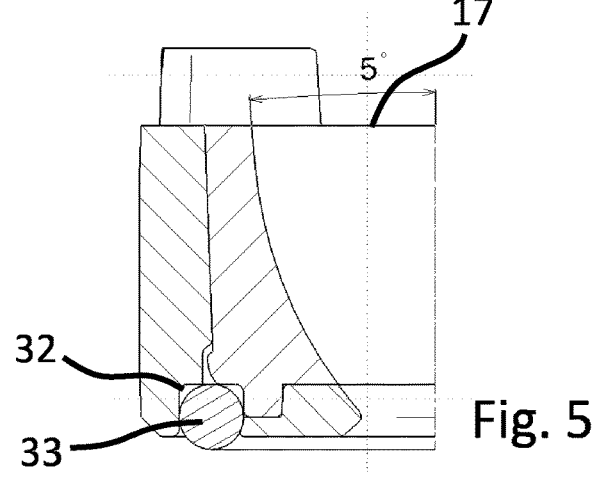
FIG. 5 shows a schematic side-cut view of a tangential outlet region of the ball shell element arranged in the housing device.
Figure 6:
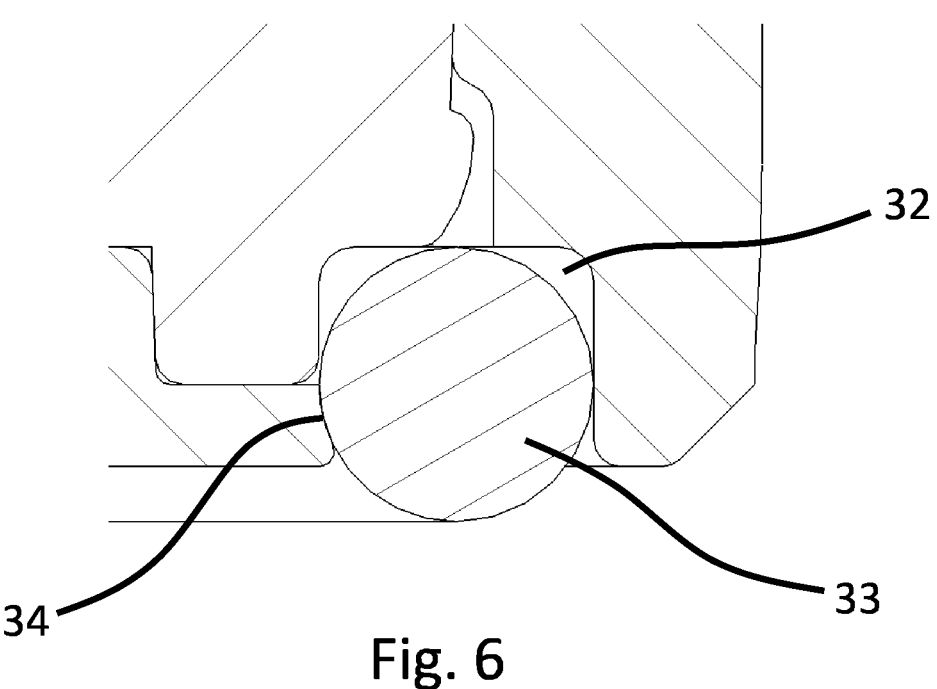
FIG. 6 shows a schematic side-cut perspective detail view of the ball socket apparatus with a ring receiving recess and an EPDM ring.
Figure 7:
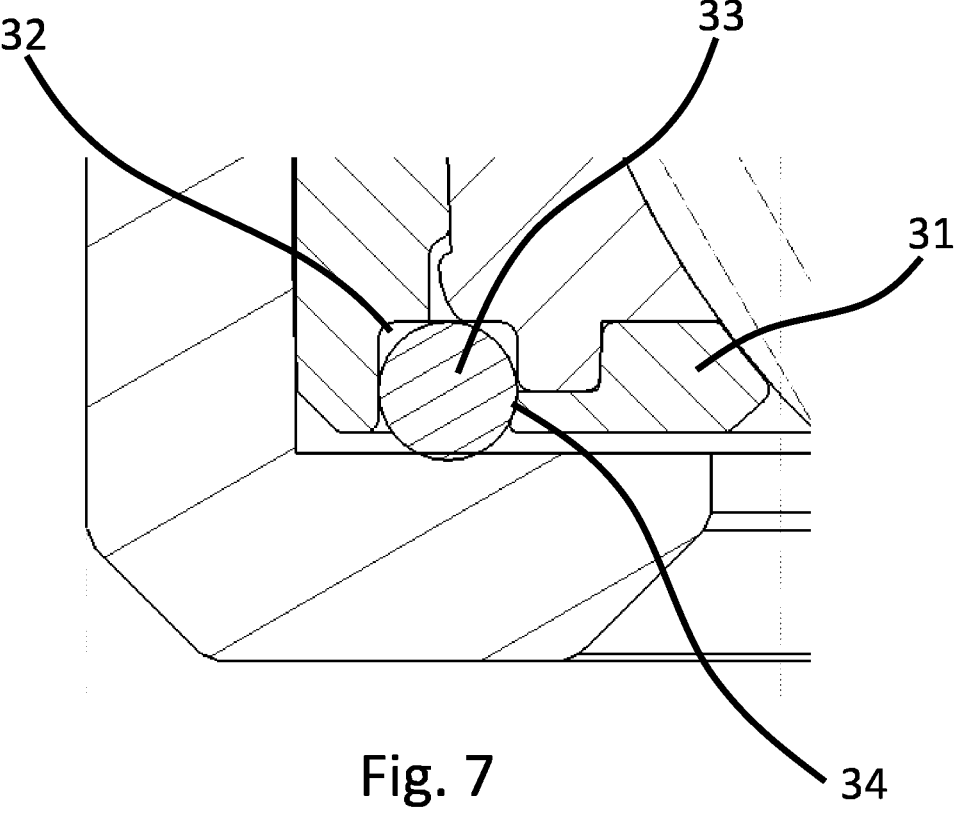
FIG. 7 shows a schematic side-cut perspective detail view of the ball socket apparatus with a ring receiving recess and an EPDM ring, wherein a flow brake is provided in the region of a ball portion of a ball joint.
Figure 8:
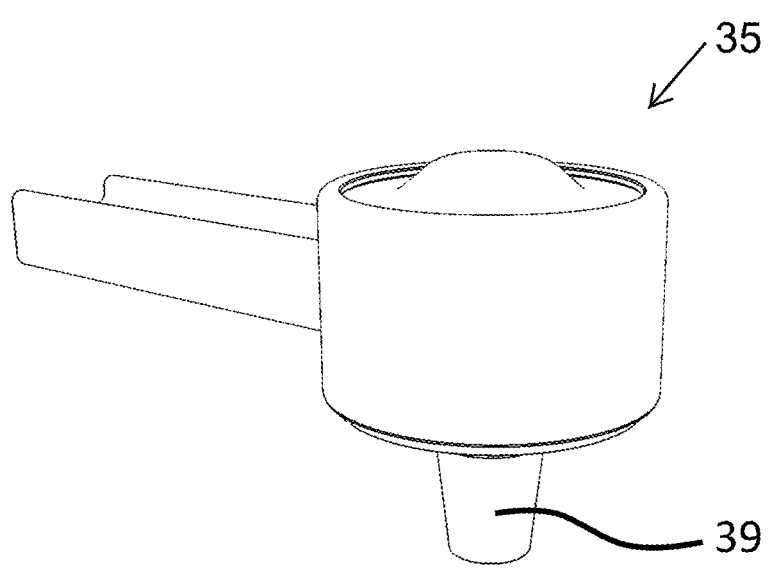
FIG. 8 shows a perspective schematic view of a ball joint apparatus according to the present invention.
Figure 9:
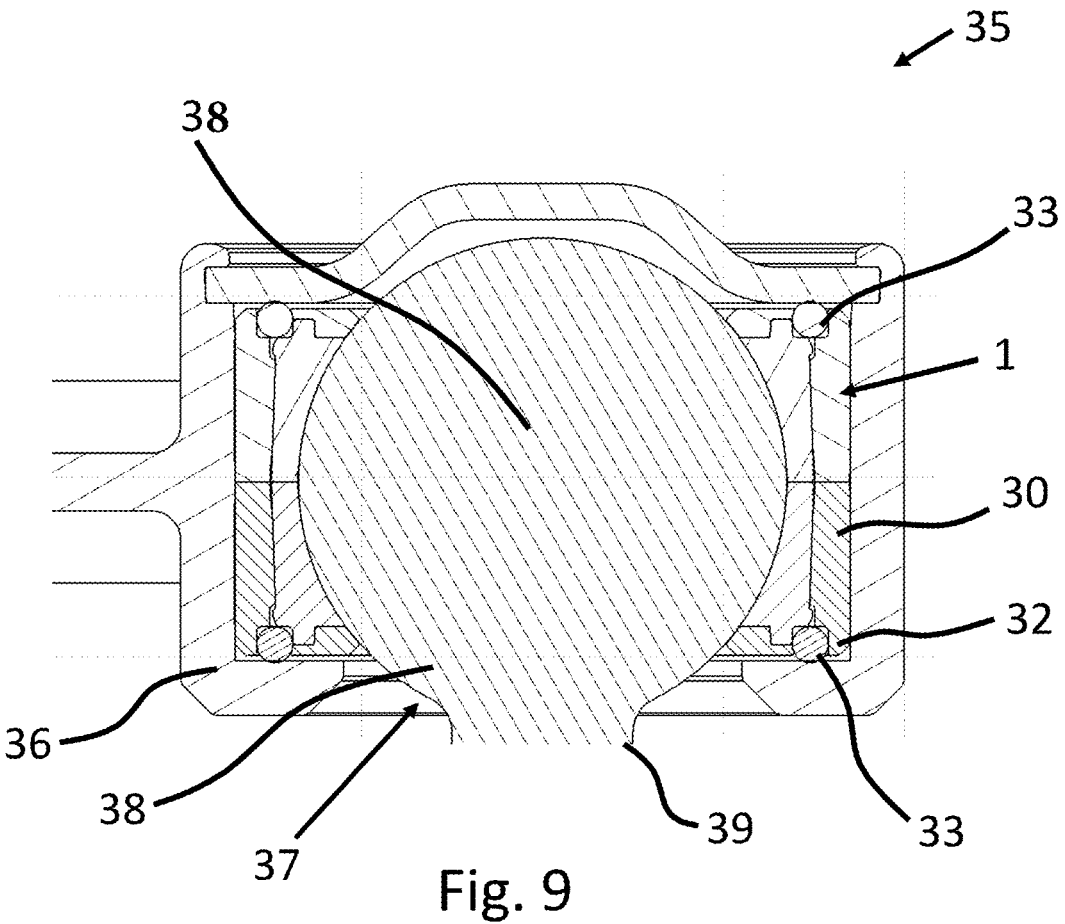
FIG. 9 shows a side-cut view of the ball joint apparatus with a ball portion and the ball socket apparatus according to the invention.

The ball socket apparatus 1 according to the invention will now be described in further detail on the basis of an exemplary embodiment shown in the figures (FIGS. 1 to 9).

The ball socket apparatus 1 according to the invention, i.e., a ball socket or a ball bushing for bearing a joint head or a ball head of a ball pin, comprises a first ball shell element 2 and a second ball shell element 3, which are respectively arranged in a first housing device 4 and a second housing device 5.

The first ball shell element 2 and the second ball shell element 3 are configured so as to be symmetrical.

The first housing device 4 and the second housing device 5 are preferably also configured so as to be symmetrical to one another.

Furthermore, the ball shell elements 2, 3 are formed in a half-shell annular manner, wherein these ball segment portions comprise two free edges 6, 7. The free edge 7 has a larger diameter than the free edge 6.

An inner casing wall 8 of the ball shell element 2, 3 is formed as a circular segment in cross-section and forms a radially circumferential, continuous contact surface for a ball portion of a joint head.

Although the ball shell element 2, 3 comprises a slot extending in the axial direction, it is still referred to as a continuous, radially circumferential contact surface for a ball portion of a ball joint in the context of the present invention.

An outer casing wall 9 of the ball shell elements is also formed as a circular segment in cross-section.

At the free edge 6, catching elements 12 extending in the axial direction 10 and in the radial direction 11 are formed.

The housing device 4, 5 has correspondingly configured catching recesses 14 in the region of a base wall portion 13.

The catching elements are formed on the outer casing wall 9 of the ball shell element 2, 3 so as to be radially circumferential and equally spaced from one another.

Furthermore, a second tolerance compensation structure 15 is formed on the outer casing wall 9 of the ball shell element 2, 3. The second tolerance compensation structure 15 is preferably configured in a plurality of radially circumferential ribs 16 that are arranged so as to be equally spaced apart from one another.

By receiving the catching elements 12 of the ball shell element 2, 3 in the corresponding catching recesses 14 of the housing device 4, 5, a loss-proof and/or rotation-proof arrangement of the ball shell element 2, 3 in the housing device 4, 5 is realized.

In the region of the free [edge] 7 that forms the connecting edge for connecting to or abutting against the first ball shell element 2 and the second ball shell element 3, a material recess in the form of a tangential outlet portion 17 is provided in the region of the contact surface on the inner casing wall 8. In the region of the tangential outlet portion 17, the inner casing wall 8 no longer takes the shape of an ideal circle; rather, a material recess is provided in the tangential outlet portion 17.

The housing device 4, 5 comprises a radially circumferential side wall portion 18 and the annular base wall portion 13.

A housing tolerance compensation structure 21 is formed on an outer casing wall 20 of the housing device 4, 5. The tolerance compensation structure preferably comprises ribs 22 extending in the axial direction 10. The tolerance compensation structure 21 or the corresponding ribs 22 can compensate for a clearance between the housing device 4, 5 and a corresponding joint housing of a ball joint apparatus.

An inner casing wall 23 of the housing device 4, 5 is also approximately formed as a circular segment in cross-section, wherein the corresponding catching recesses 14 are provided extending in the axial direction 10 and in the radial direction 11.

At the regions between the catching recesses 14, ribs 24 are formed extending in the axial direction, which form a first tolerance compensation structure 25.

The housing device 4, 5 also comprises a free edge 26 in the region of the free edge 7 of the ball shell element 2, 3. In the free edge 26 or a corresponding radially circumferential connecting edge 27, connecting webs 28 and connecting recesses 29 extending in the axial direction 10 are configured in order to receive the connecting webs 28. The connecting webs 28 and the connecting recesses 29 are radially circumferential and arranged so as to be equally spaced apart as well as alternating.

In a connected state between the first housing device 4 and the second housing device 5, the respective connecting webs 28 in the connecting recesses 29 are connected to one another with a corresponding press fit, so that the first housing device 4 and the second housing device 5 form a housing 30.

In the annular base wall portion 19 of the housing device 4, 5, an axial end portion of the ball shell element 2, 3 abuts in portions in order to prevent the material of the ball shell element from flowing away in this region due to axial stress, in particular. This portion is referred to hereinafter as the flow brake 31. The flow brake 31 forms an annular region in a top plan view, the surface of which extends in the radial direction 11 or orthogonally to the axial direction 10.

Furthermore, an annular ring receiving recess 32 is formed in the region between the base wall portion 19 and the side wall portion 18.

The ring receiving recess 32 is approximately rectangular in cross-section and is provided for receiving an annular elastomeric or EPDM ring 33.

A region of the base wall portion of the ring receiving recess 32 facing outward in the radial direction 11 is configured as a circular segment in cross-section or in an undercut manner in order to receive the EPDM ring 33 in a loss-proof manner. This surface is hereinafter referred to as the loss-proofing surface 34.

The ball shell elements 2, 3 and the corresponding housing devices 4, 5 are respectively made of two different plastics by means of a single-component injection molding method. These are then connected to one another manually or with a machine.

Alternatively, the ball shell elements 2, 3 and the housing devices 4, 5 can also be manufactured by means of a dual component injection molding method from two different plastics, such that a ball shell element and a corresponding housing device are connected to one another in a material-locking manner.

Furthermore, a ball joint apparatus 35 according to the invention is provided, which comprises a joint housing 36, a ball socket apparatus 1 received in the joint housing 36, and a joint head 37 having a ball portion 38 and an arm portion 39, which is pivotally borne in the ball socket apparatus 1.

LIST OF REFERENCE NUMERALS

1 Ball socket apparatus
2 First ball shell element
3 Second ball shell element
4 First housing device
5 Second housing device
6 Free edge
7 Free edge
8 Inner casing wall
9 Outer casing wall
10 Axial direction
11 Radial direction
12 Catching element
13 Base wall portion
14 Catching recess
15 Second tolerance compensation structure
16 Ribs
17 Tangential outlet portion
18 Side wall portion
19
20 Outer casing wall
21 Housing tolerance compensation structure
22 Rib
23 Inner casing wall
24 Rib
25 First tolerance compensation structure
26 Free edge
27 Radially circumferential connecting edge
28 Connecting webs
29 Connecting recesses
30 Housing
31 Flow brake
32 Ring receiving recess

33 EPDM ring
34 Loss-proofing surface
35 Ball joint apparatus
36 Joint housing
37 Joint head
38 Ball portion
39 Arm portion

The invention claimed is:

1. A ball socket apparatus for bearing a joint head, comprising:
   a ball shell comprising a first ball shell element and a second ball shell element, wherein the ball socket apparatus forms at least one radially circumferential, continuous joint head contact surface, and
   a housing comprising a first and a second housing device in which the first and second ball shell elements are arranged;
   wherein the first housing device and the second housing device each have a radially circumferential connecting edge, wherein connecting webs and connecting recesses for receiving the connecting webs extending in an axial direction are arranged in each connecting edge such that the first housing device and the second housing device each comprise connecting recesses and connecting webs arranged so as to correspond to one another, wherein the connecting recesses and the connecting webs are connected to one another by a radially circumferential press fit in order to form the housing;
   wherein each of the first ball shell element and the second ball shell element comprises catching elements extending in the axial direction and/or in a radial direction, the catching elements extending from a free edge of the ball shell elements, which are receivable in correspondingly configured catching recesses of the first housing device and the second housing device, in an undercut manner, in order to connect the ball shell to the housing in a loss-proof manner.

2. A ball socket apparatus according to claim 1, wherein the housing includes an outer casing wall comprising a housing tolerance compensation structure for compensating for a clearance between the housing and a joint housing of a ball joint apparatus.

3. The ball socket apparatus of claim 2, wherein the housing tolerance compensation structure is formed as a knurling or ribs extending in the axial direction.

4. The ball socket apparatus according to claim 1, wherein the housing includes an inner casing wall comprising a first tolerance compensation structure; and/or
   the ball shell includes an outer casing wall comprising a second tolerance compensation structure for compensating a clearance between the housing and the ball shell.

5. The ball socket apparatus of claim 4, wherein the first tolerance compensation structure and/or the second tolerance compensation structure is formed as a knurling or ribs arranged in a grid-like fashion.

6. The ball socket apparatus according to claim 1, wherein each of the first ball shell element and the second ball shell element includes:
   an inner casing wall having a circular segment in cross-section, wherein the inner casing wall comprises a tangential outlet portion in a region of the connecting edge of the respective housing device and continuous with the circular segment, in which the outlet portion deviates from the circular shape in order to reduce or prevent stress peaks.

7. The ball socket apparatus according to claim 1, wherein the first housing device comprises a first annular base wall portion against which an axial end portion of the first ball shell element abuts in order to prevent a material of the first ball shell element from flowing away in a region of the first annular base wall; and
   the second housing device comprises a second annular base wall portion against which an axial end portion of the second ball shell element abuts in order to prevent a material of the second ball shell element from flowing away in a region of the second annular base wall.

8. The ball socket apparatus according to claim 1, wherein the first housing device comprises an annular first base wall portion having first open, annular ring receiving recess, in which a first annular elastomeric or EPDM ring is arranged in order to absorb axial forces occurring in the ball socket apparatus, wherein the first base wall portion and the first elastomeric ring are configured to be formed, in a region of an arm portion of the joint head, wherein a surface of the first base wall portion of the first ring receiving recess facing in the radial direction is formed in an undercut manner in order to receive the first elastomeric ring in a loss-proof manner and/or partially receive loads acting on the first elastomeric ring.

9. The ball socket apparatus according to claim 1, wherein the first and second ball shell elements are manufactured or configured from polyketone (PK), polyphthalamides (PPA), polybutylene terephthalate (PBT) with carbon fibers for reinforcement, and/or polytetrafluoroethylene (PTFE) and/or graphite.

10. A ball joint apparatus, comprising:
    a joint housing, the ball socket apparatus according to claim 1 received in the joint housing, and a joint head having a ball portion pivotally borne in the ball socket apparatus.

* * * * *